(12) United States Patent
Williams

(10) Patent No.: US 10,644,797 B2
(45) Date of Patent: May 5, 2020

(54) COMMUNICATION NETWORKS INCLUDING HOME NETWORK TRANSLATION DEVICES AND ASSOCIATED METHODS

(71) Applicant: CABLE TELEVISION LABORATORIES, INC., Louisville, CO (US)

(72) Inventor: Thomas Holtzman Williams, Longmont, CO (US)

(73) Assignee: CABLE TELEVISION LABORATORIES, INC., Louisville, CO (US)

(*) Notice: Subject to any disclaimer, the term of this patent is extended or adjusted under 35 U.S.C. 154(b) by 0 days.

(21) Appl. No.: 16/252,324

(22) Filed: Jan. 18, 2019

(65) Prior Publication Data

US 2019/0222316 A1    Jul. 18, 2019

Related U.S. Application Data

(60) Provisional application No. 62/618,762, filed on Jan. 18, 2018.

(51) Int. Cl.
    *H04B 10/2575* (2013.01)
    *H04L 12/28* (2006.01)
    *H04L 29/06* (2006.01)

(52) U.S. Cl.
    CPC ..... *H04B 10/2575* (2013.01); *H04L 12/2801* (2013.01); *H04L 12/2803* (2013.01); *H04L 12/2898* (2013.01); *H04L 69/18* (2013.01)

(58) Field of Classification Search
    None
    See application file for complete search history.

(56) References Cited

U.S. PATENT DOCUMENTS

| | | | | |
|---|---|---|---|---|
| 5,436,822 A | * | 7/1995 | West, Jr. | H02M 7/538 348/E7.049 |
| 9,762,349 B1 | * | 9/2017 | Dai | H04J 14/0226 |
| 2002/0080002 A1 | * | 6/2002 | Oldfield | H01F 27/255 336/231 |
| 2004/0165889 A1 | * | 8/2004 | Mahony | H04B 10/272 398/71 |
| 2008/0310842 A1 | * | 12/2008 | Skrobko | H04B 10/25753 398/72 |
| 2011/0001833 A1 | * | 1/2011 | Grinkemeyer | H04H 20/12 348/192 |
| 2013/0003719 A1 | * | 1/2013 | Kamdar | H04L 65/1069 370/352 |

* cited by examiner

*Primary Examiner* — Robert M Morlan
(74) *Attorney, Agent, or Firm* — Lathrop GPM LLP

(57) ABSTRACT

A communication network includes a first electrical cable, a home network translation device, and a first termination device. The home network translation device is communicatively coupled between an optical cable and the first electrical cable, and the home network translation device is configured to translate data between an optical protocol on the optical cable and a home networking protocol on the first electrical cable. The first termination device is communicatively coupled to the first electrical cable and is configured to translate data between the home networking protocol on the first electrical cable and an additional protocol on an additional communication medium communicatively coupled to the first termination device.

9 Claims, 11 Drawing Sheets

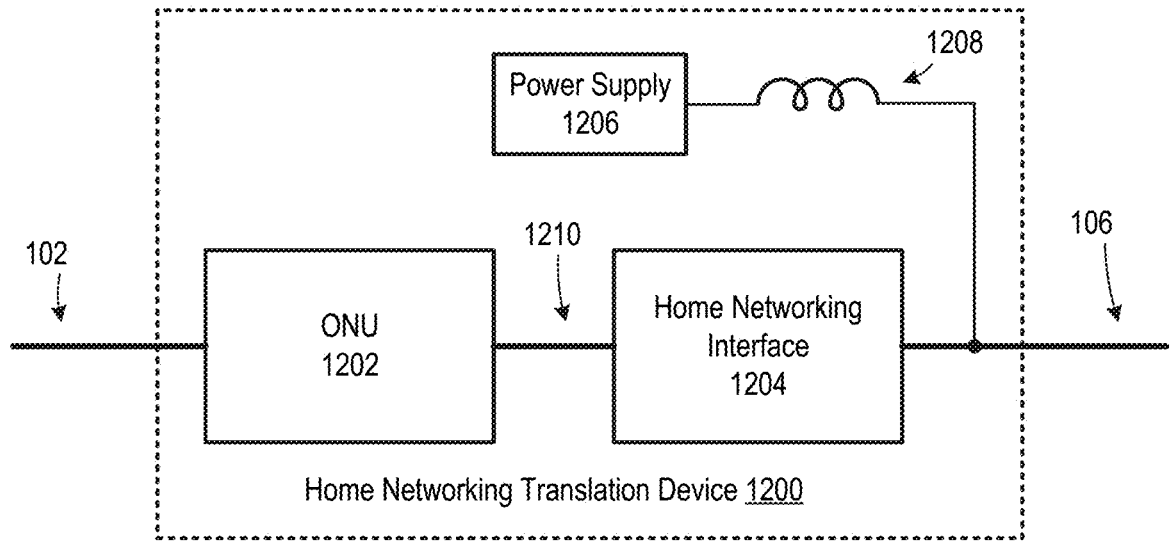
FIG. 12
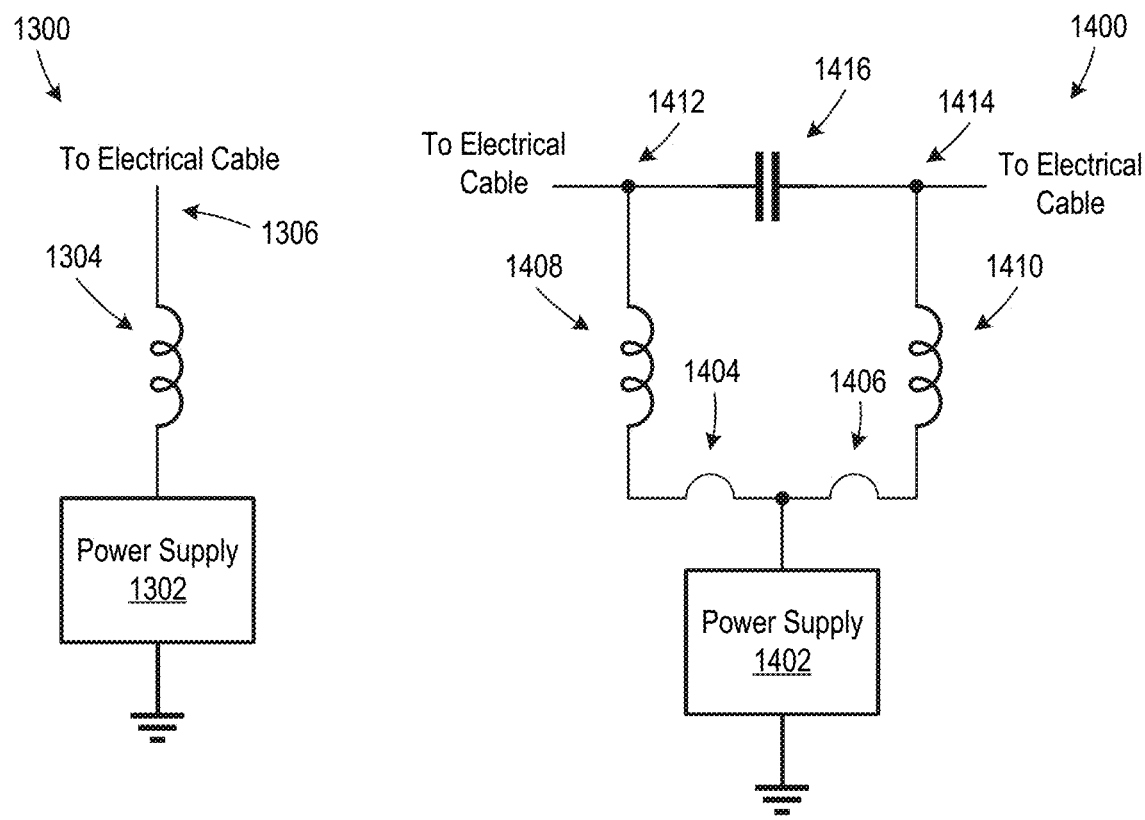
FIG. 13
FIG. 14

COMMUNICATION NETWORKS INCLUDING HOME NETWORK TRANSLATION DEVICES AND ASSOCIATED METHODS

RELATED APPLICATIONS

This application claims benefit of priority to U.S. Provisional Patent Application Ser. No. 62/618,762, filed on Jan. 18, 2018, which is incorporated herein by reference.

BACKGROUND

Access communication networks are used to provide communication network services in a local area or in a regional area. For example, cable television companies use access networks to provide services, e.g., video service, Internet service, and/or telephone service, in a local or regional area. As another example, telephone companies use access networks to provide services, e.g., telephone service and/or Internet service, in a local or regional area.

Access communication networks conventionally use electrical cables to connect a customer premises to the remainder of the access communication network. For example, cable television companies conventionally use coaxial electrical cables to connect customer premises to the remainder of the company's communication access network, and telephone companies conventionally use twisted-pair electrical cables to connect customer premises to the remainder of the company's communication access network.

BRIEF DESCRIPTION OF THE DRAWINGS

FIG. 12 is a schematic diagram illustrating a home network translation device, according to an embodiment.

FIG. 13 is a schematic diagram illustrating a power inserter, according to an embodiment.

FIG. 14 is a schematic diagram illustrating another power inserter, according to an embodiment.

DETAILED DESCRIPTION OF THE EMBODIMENTS

Figure 1:
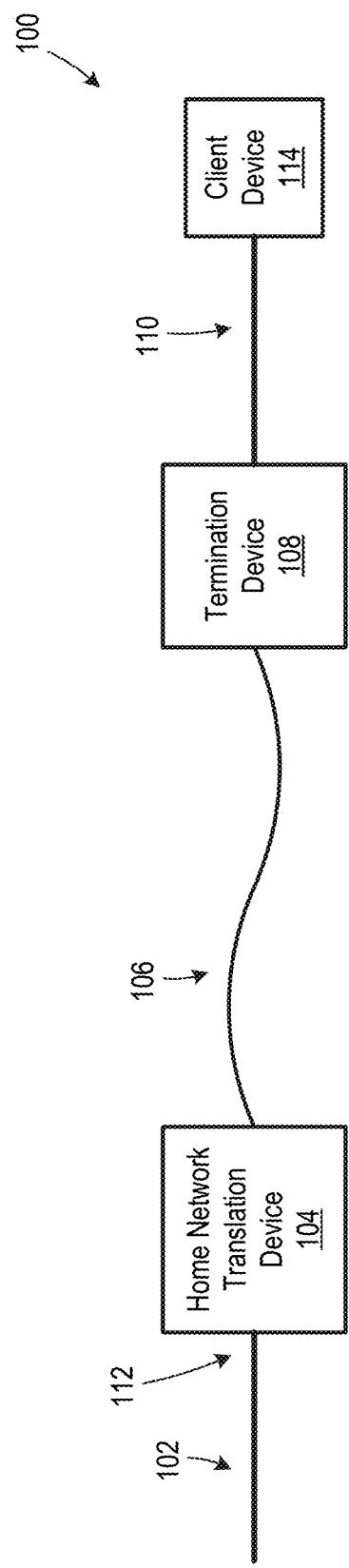
FIG. 1 is a schematic diagram illustrating a portion of a communication network including a home network translation device at an optical-electrical interface, according to an embodiment.

There is a need for access communication networks to provide additional communication bandwidth to customer premises. For example, many Internet applications, such as streaming media applications and video conferencing applications, require high communication bandwidth. As another example, many households and businesses now possess multiple Internet-connected devices which collectively require significant communication bandwidth. In response, technology has been developed to increase communication capability of electrical cables. For example, Data Over Cable Service Interface Specification (DOCSIS) technology has enabled dramatic increases in communication bandwidth of coaxial electrical cables. As another example, very-high-bit-rate digital subscriber line (VDSL) technology has enabled increase in bandwidth of twisted-pair electrical cables.

However, optical cables are currently capable of much higher communication bandwidth the electrical cables. Therefore, communication service providers are extending optical cables deeper into their networks, e.g., to locations closer to customer premises, to increase communication network capacity. For example, cable television networks were conventionally formed of coaxial electrical cable from a headend to customer premises. Cable television companies have been replacing portions of their networks with optical cable, such that information is carried between the headend and an optical node via optical cable, and coaxial cable is used to carry information between the optical node and customer premises. As another example, telephone networks were conventionally formed of twisted-pair electrical cable from a network central office to customer premises. Telephone companies have also been replacing portions of their networks with optical cable, such that information is carried from the central office to a remote terminal (RT) via optical cable, and twisted-pair cable is used to carry information from the RT to customer premises.

It is anticipated that communication service providers will extend optical cable even deeper into their networks, e.g., to local terminal units that serve at most several customer premises, to increase network communication bandwidth. Examples of such local terminal units include, but are not limited to, coaxial cable taps, twisted-pair terminal blocks, and twisted-pair splice cases. However, it is expected that electrical cables between local terminal units and customer premises, sometime referred to as drop cables, will frequently not be replaced with optical cable, to avoid cost and disruption associated with cable replacement.

Disclosed herein are communication networks and associated methods which facilitate extension of optical cables deeper into communication networks while permitting use of existing electrical drop cables. The disclosed communication networks and methods translate data between an optical protocol and a home networking protocol at an optical to electric (O/E) interface, i.e., where an optical cable meets an electrical cable. Performing such protocol translation at the O/E interface, instead of downstream for the O/E interface, may eliminate the need for translating data between an optical protocol and an access network electrical protocol such as DOCSIS or VDSL, thereby promoting low communication network cost, high communication network reliability, and low communication network latency.

FIG. 1 is a schematic diagram illustrating a portion 100 of a communication network, which is one embodiment of the new communication networks disclosed herein. Network portion 100 includes an optical cable 102, a home network translation device 104, an electrical cable 106, a termination device 108, and a communication medium 110. An end 112 of optical cable 102 is communicatively coupled to home network translation device 104, and an opposing end of optical cable 102 is communicatively coupled to other network infrastructure (not shown). Examples of this other network infrastructure include, but are not limited to, a cable television optical node, a cable television headend (e.g., including a cable modem termination system), a telephone network remote terminal, a telephone network central office, an optical splitter, an optical concentrator, an optical switch, an optical line terminal (OLT), a network switch, a network router, and a wireless transceiver.

Electrical cable 106 communicatively couples home network translation device 104 and termination device 108. In certain embodiments, electrical cable 106 is a coaxial electrical cable or a twisted-pair electrical cable. Electrical cable 106, for example, includes a drop cable. Home network translation device 104 is configured to translate data between an optical protocol on optical cable 102 and a home networking protocol on electrical cable 106. Examples of the optical protocol include, but are not limited to, an Ethernet passive optical network (EPON) protocol, a radio frequency of over glass (RFOG or RFoG) protocol, a Gigabit-capable passive optical network (GPON) protocol, and any variations, improvements, and/or evolutions thereof. The optical protocol could also be a future-developed optical protocol. Examples of the home networking protocol include, but are not limited to, a Multi-Media over Coax (MoCA) protocol, a HomePNA (G.hn) protocol, and any variations, improvements, and/or evolutions thereof. The home networking protocol could also be a future-developed home networking protocol that is compatible with electrical cable 106.

Termination device 108 is configured to translate data between the home networking protocol on electrical cable 106 and an additional protocol on an additional communication medium 110 communicatively coupled to first termination device 108. By way of example and not of limitation, the additional protocol may be an Ethernet protocol, e.g., a wired Ethernet protocol or a wireless Ethernet protocol. A client device 114 is optionally communicatively coupled to additional communication medium 110. In embodiments including client device 114, home network translation device 104 is optionally configured to serve as a network host for client device 114, e.g. to provide an Internet protocol (IP) address to client device 114. Examples of client device 114 include, but are not limited to, a computer, a set-top device, a data storage device, an Internet of Things (IoT) device, an entertainment device, a wireless access point, a computer networking device, a mobile telephone, a smartwatch, a wearable device with wireless capability, or a medical device. Termination device 108 may be communicatively coupled to two or more client devices 114 without departing from the scope hereof.

Figure 2:
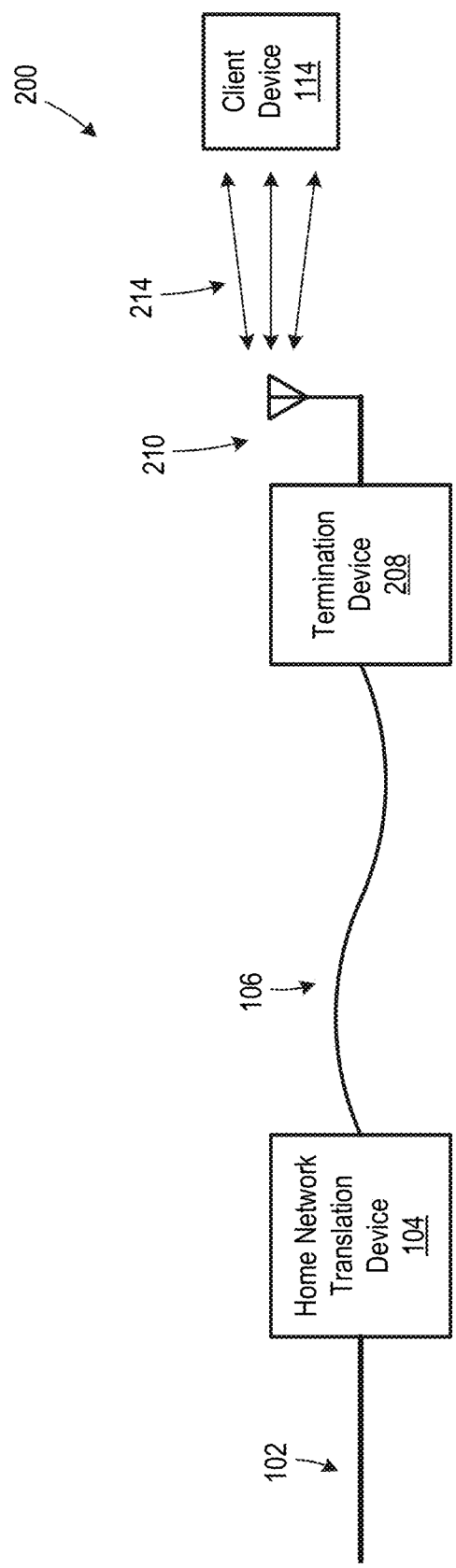
FIG. 2 is a schematic diagram illustrating a portion of another communication network including a home network translation device at an optical-electrical interface, according to an embodiment.

In certain embodiments, such as illustrated in FIG. 1, additional communication medium 110 is a cable, e.g., an electrical cable or an optical cable, connecting termination device 108 to client device 114. For example, in a certain embodiment, additional communication medium 110 is an Ethernet cable connecting termination device 108 to client device 114. In certain other embodiments, additional communication medium 110 is a wireless communication medium. For example, FIG. 2 is a schematic diagram illustrating a portion 200 of a communication network which is similar to network portion 100 but with termination device 108 replaced with a termination device 208. Termination device 208 is similar to termination device 108, but with additional communication medium 110 embodied by a wireless communication network 210. Wireless communication network 210 is, for example, an IEEE 802.11 (Wi-Fi) communication network, a Bluetooth wireless communication network, a Worldwide Interoperability for Microwave Access (WiMAX) wireless communication network, a third-generation (3G) wireless communication network, a long-term evolution (LTE) wireless communication network, a fifth-generation (5G) wireless communication network, a sixth-generation (6G) wireless communication network, or any variations, improvements, and/or evolutions thereof. Wireless communication network 210 communicates with one or more client devices 114 via radio signals 214.

It should be appreciated that in the embodiments of FIGS. 1 and 2, data is transmitted from optical cable 102 to client devices 114 without use of an access network electrical protocol, e.g., without use of a DOCSIS protocol or a VDSL protocol. As a result, the architecture of network portions 100 and 200 promotes low cost, high-reliability, and low latency.

In some embodiments, home network translation device 104 is communicatively coupled to a cable modem termination system (CMTS) (not shown) via optical cable 102. In these embodiments, upstream transmission of data, i.e. from home network translation device 104 to the CMTS, is optionally controlled by the CMTS via a DOCSIS protocol. For example, in certain of these embodiments, home network translation device 104 transmits data upstream in response to receiving a DOCSIS grant from the CMTS, instead of or in addition to a time-divisional multiplexing (TDD) optical protocol signal. Controlling upstream data transmission from home network translation device 104 by a CMTS may promote low-cost and implementation simplicity in embodiments of network portions 100 and 200 which are implemented with an existing CMTS.

Additionally, in some embodiments, network portions 100 and 200 are configured to transmit an additional signal, such as a broadcast radio signal, a broadcast television signal, and/or a telephone signal, from optical cable 102 to client devices 114. In these embodiments, home network translation device 104 implements a home network protocol that does not interfere with the additional signal. For example, in a particular embodiment, home translation network device 104 is configured to transmit therethrough a broadcast signal (e.g., a radio or television broadcast signal) from optical cable 102 to electrical cable 106, and home translation network device 104 transmits data over electrical cable 106 using a home networking protocol that operates in a different frequency band than the broadcast signal. Additionally, in some embodiments, home translation network device 104 includes an analog-to-digital converter configured to convert digital data into a block of radio frequency signals for use in a customer premises, such as for use by a television, a set-top box, and/or a frequency modulation (FM) radio.

Figure 3:
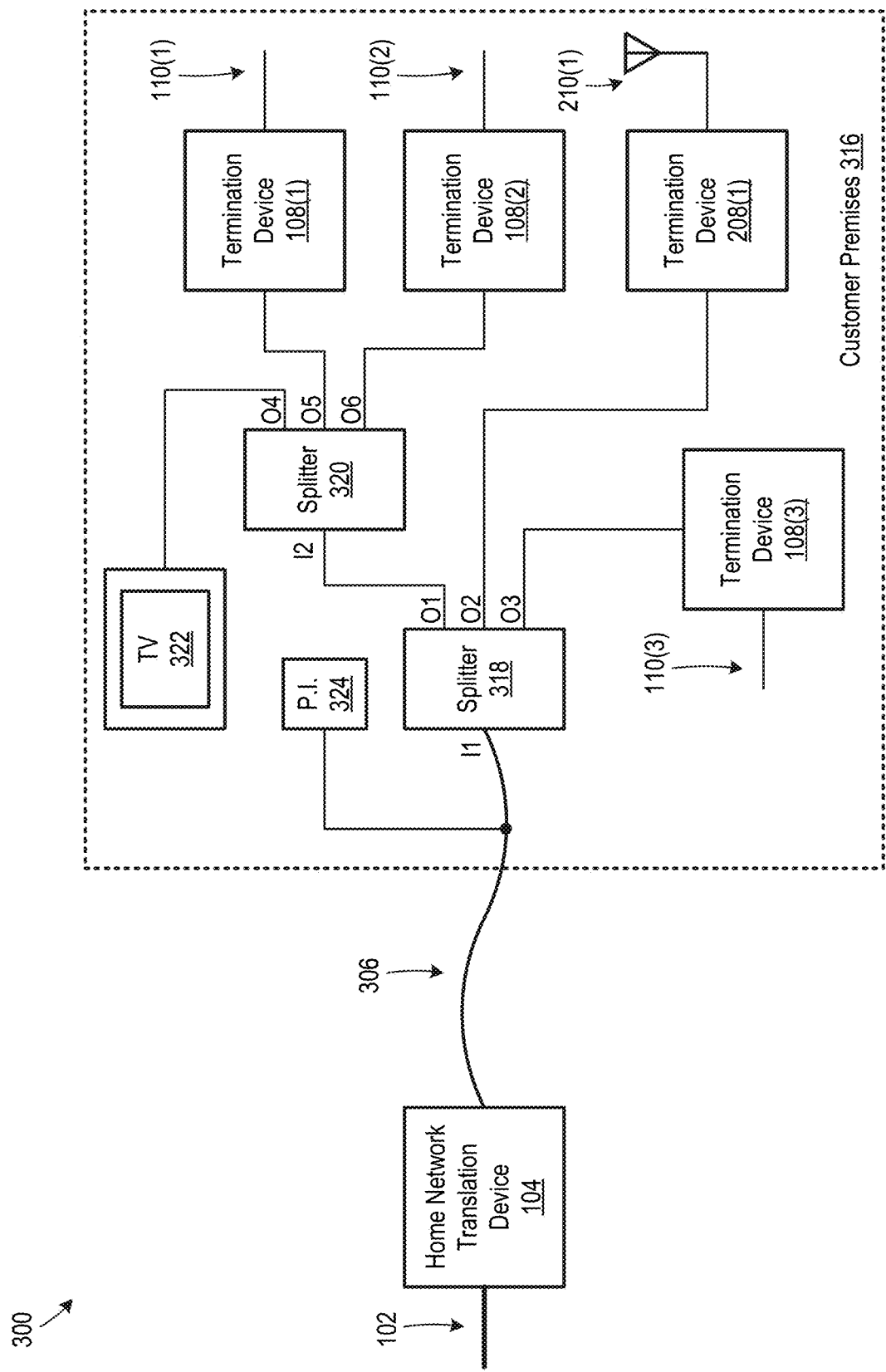
FIG. 3 is a schematic diagram illustrating a portion of a communication network including a home network translation device located at an optical-electrical interface outside of a customer premises, according to an embodiment.

In some embodiments, home network translation device 104 is located within a customer premises, and termination device 108 is located outside of the customer premises. For example, FIG. 3 is a schematic diagram illustrating a portion 300 of a communication network, which is an embodiment of network portion 100. In network portion 300, home translation network device 104 is located within a customer premises 316, where customer premises 316 is, for example, a single-family dwelling unit, a multi-family dwelling unit, or a business. Home network translation device 104 is located outside of customer premises 316, and in some embodiments, home network translation device 104 is within an enclosure mounted on the ground, within an enclosure at least partially buried in the ground, or mounted on an aerial distribution pole. In the example of FIG. 3, customer premises 316 includes three termination devices 108 and one termination device 208, i.e., termination devices 108(1), 108(2), 108(3), and 208(1). However, the number and type of termination devices in customer premises 316, as well as the electrical topology of termination devices and splitters, may vary without departing from the scope hereof. In this document, specific instances of an item may be referred to by use of a numeral in parentheses (e.g., termination device 108(1)) while numerals without parentheses refer to any such item (e.g., termination devices 108).

In this embodiment, electrical cable 106 is embodied by coaxial electrical cable 306. Each termination device 108 and 208 is communicatively coupled to coaxial electrical cable 306 via one or more splitters, in this embodiment. In particular, coaxial electrical cable 306 is communicatively coupled to an input port I1 of a first splitter 318, and first splitter 318 splits a downstream signal at input port I1 into signals on three output ports O1, O2, and O3. Additionally, first splitter 318 combines upstream signals at each of output ports O1, O2, and O3 into a signal at input port I1. Termination devices 208(1) and 108(3) are communicatively coupled to output ports O2 and O3 via respective coaxial electrical cables, and termination devices 208(1) and 108(3) are therefore communicatively coupled to coaxial electrical cable 306 via first splitter 318. Output port O1 is coupled to an input port I2 of a second splitter 320 via a coaxial electrical cable. Second splitter 320 operates in a manner analogous to that of first splitter 318. Specifically, second splitter 320 splits a downstream signal at input port I2 into signals on three output ports O4, O5, and O6, and second splitter 320 combines upstream signals at each of output ports O4, O5, and O6 into a signal at input port I2. Termination devices 108(1) and 108(2) are communicatively coupled to output ports O5 and O6 via respective coaxial cables, and termination devices 108(1) and 108(2) are therefore communicatively coupled to coaxial electrical cable 306 via first splitter 318 and second splitter 320.

Figure 4:
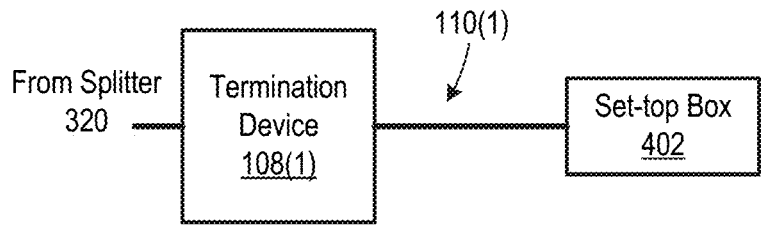
FIG. 4 is a schematic diagram illustrating an example of a termination device being communicatively coupled to a set-top box, according to an embodiment.
Figure 5:
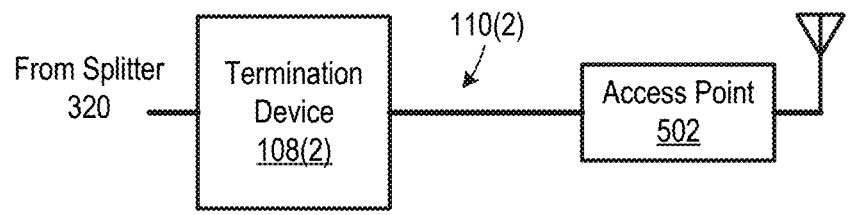
FIG. 5 is a schematic diagram illustrating an example of a termination device being communicatively coupled to a wireless access point, according to an embodiment.
Figure 6:
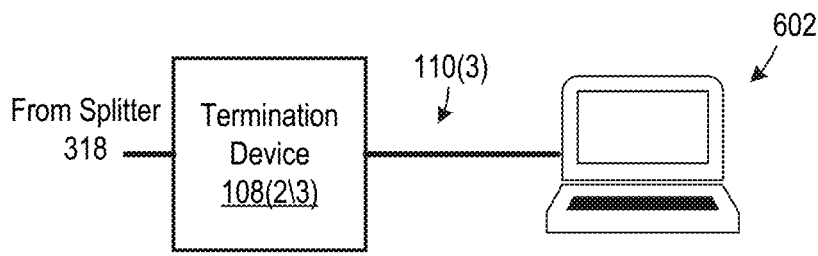
FIG. 6 is a schematic diagram illustrating an example of a termination device being communicatively coupled to a computer, according to an embodiment.

Each termination device 108 and 208 in network portion 300 is optionally communicatively coupled to one or more client devices, e.g. client devices of FIG. 1, which are not shown in FIG. 3 to promote illustrative clarity. However, FIG. 4-6 are schematic diagrams showing several examples of termination devices 108 being communicatively coupled to client devices. In particular, FIG. 4 is a schematic diagram illustrating an example of termination device 108(1) being communicatively coupled to a set-top box 402 via additional communication medium 110(1) (e.g., an Ethernet cable), and FIG. 5 is a schematic diagram illustrating an example of termination device 108(2) being communicatively coupled to a wireless access point (e.g., a Wi-Fi wireless access point) via additional communication medium 110(2) (e.g., an Ethernet cable). FIG. 6, in turn, is a schematic diagram illustrating an example of termination device 108(3) being communicatively coupled to a computer 602 (e.g., a personal computer) via additional communication medium 110 (3) (e.g., an Ethernet cable). It should be appreciated that termination devices 108 and 208 need not be connected to client devices as illustrated in the examples of FIGS. 4-6, but to the contrary, termination devices 108 and 208 could be connected to different client devices, or even to no client devices at all, without departing from the scope hereof.

Referring again to FIG. 3, network portion 300 optionally further includes one or more televisions 322 configured to receive a broadcast signal. Each television 322 is communicatively coupled to coaxial electrical cable 306, e.g., via one or more splitters. For instance, television 322 is communicatively coupled to coaxial electrical cable 306 via first splitter 318 and second splitter 320 in the FIG. 3 example. In embodiments including one or more televisions 322, home network translation device 104 is configured to transmit therethrough a broadcast television signal from optical cable 102 to coaxial electrical cable 306, and home network translation device 104 transmits data over coaxial electrical cable 306 using a home networking protocol that operates in a different frequency band than the broadcast television signal.

Network portion 300 optionally further includes a power inserter 324 in customer premises 316, where power inserter 324 is configured to insert electrical power, e.g., alternating current (AC) and/or direct current (DC) electrical power, onto network portion 300. Accordingly, in particular embodiments, power inserter 324 is configured to electrically power home translation network device 104 via coaxial electrical cable 306, which may advantageously eliminate the need for an utility electrical power connection at home network translation device 104.

Conventional splitters are designed to prevent transmission of signals between output ports. However, it may be desirable to permit communication among termination devices 108 and/or 208, such as for peer-to-peer communication. Therefore, in some embodiments, first splitter 318 and second splitter 320 are configured to permit communication among output ports, e.g., among output ports O1, O2, and O3 in first splitter 318, and among output ports O4, O5, and O6 in second splitter 320. In other words, in these embodiments, first splitter 318 and second splitter 320 are not conventional splitters but are instead splitters designed to allow transmission of home networking signals between output ports. In these embodiments, first splitter 318 and second splitter 320 provide a communication path between termination devices 108(1), 108(2), 108(3), and 208(1).

Figure 7:
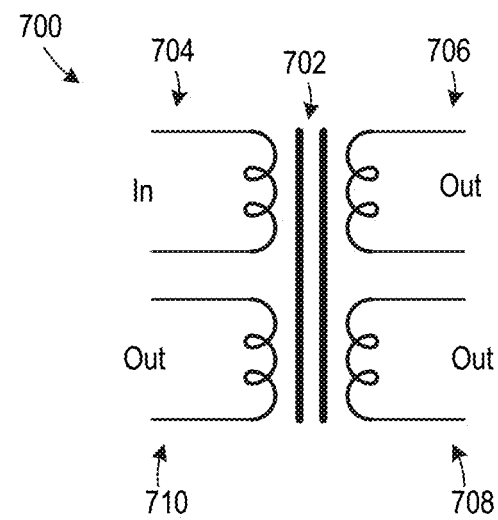
FIG. 7 is a schematic diagram illustrating a transformer, according to an embodiment.

Although special splitters may enable communication among termination devices 108 and 208, there is typically significant loss between output ports, which causes attenuation of home networking signals. Applicant has discovered that this problem can be at least substantially overcome by replacing splitters with transformers. For example, FIG. 7 illustrates a transformer 700 which Applicant has determined could be used in place of a splitter. Transformer 700 includes a magnetic core 702, an input winding 704, and three output windings 706, 708, and 710. Terminals of input winding 704 form an input port In, and terminals on each output winding 706, 708, and 710 form a respective output port Out for the winding. Magnetic core 702 is, for example, formed of a ferrite magnetic material or a powder iron magnetic material in a binder. Magnetic core 702 magnetically couples windings 704, 706, 708, and 710, and transformer 700 therefore transfers a downstream signal on input port In to each output port Out. Additionally, transformer 700 transfers an upstream signal on any one of output ports Out to each other output port Out, as well as to input port In. Accordingly, transformer 700 provides a lower-loss communication path between output ports than does a splitter, which facilitates communication between termination devices communicatively coupled to the output ports. The number of output ports may be varied by varying the number of output windings. For example, output winding 710 could be omitted if only two output ports are needed. As another example, an additional output winding could be added if an additional output port is needed.

Figure 8:
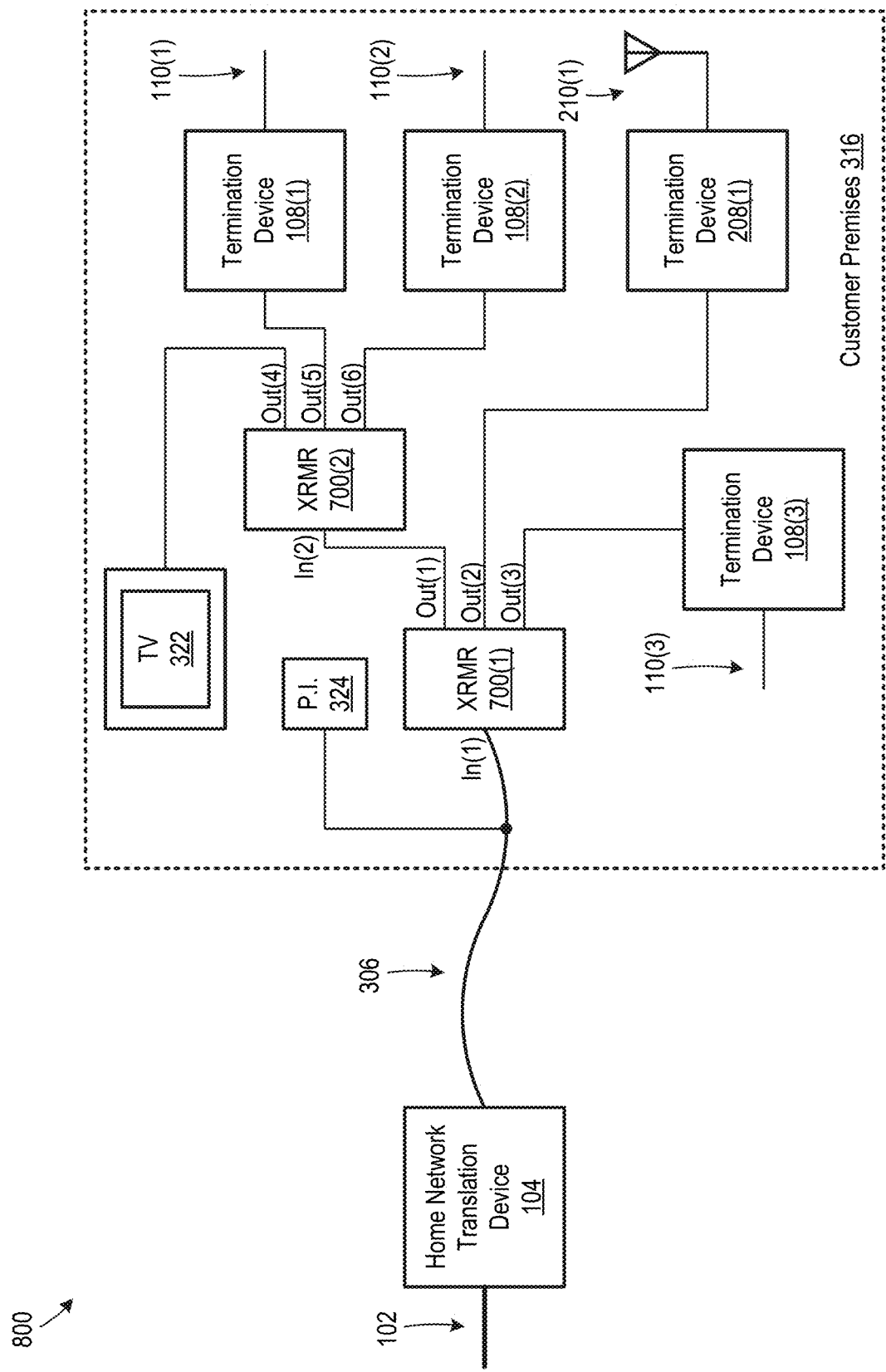
FIG. 8 is a schematic diagram illustrating a portion of a communication network including transformers in place of splitters, according to an embodiment.

FIG. 8 is a schematic diagram illustrating a portion 800 of a communication network, which is another embodiment of network portion 100. Network portion 800 is similar to network portion 300 but with first splitter 318 and second splitter 320 replaced with respective instances of transformer 700. Coaxial electrical cable 306 is communicatively coupled to an input port In(1) of transformer 700(1), and output ports Out(1), Out(2), and Out(3) of transformer 700(1) are communicatively coupled to transformer 700(2), termination device 208(1), and termination device 108(3), respectively. Output ports Out(4), Out(5), and Out(6) of transformer 700(2) are communicatively coupled to television 322, termination device 108(1), and termination device 108(2), respectively. Use of transformers 700 instead of splitters in network portion 800 advantageously helps prevent attenuation of home networking signals transmitted between termination devices, for reasons analogous to those discussed above with respect to FIG. 7.

Figure 9:
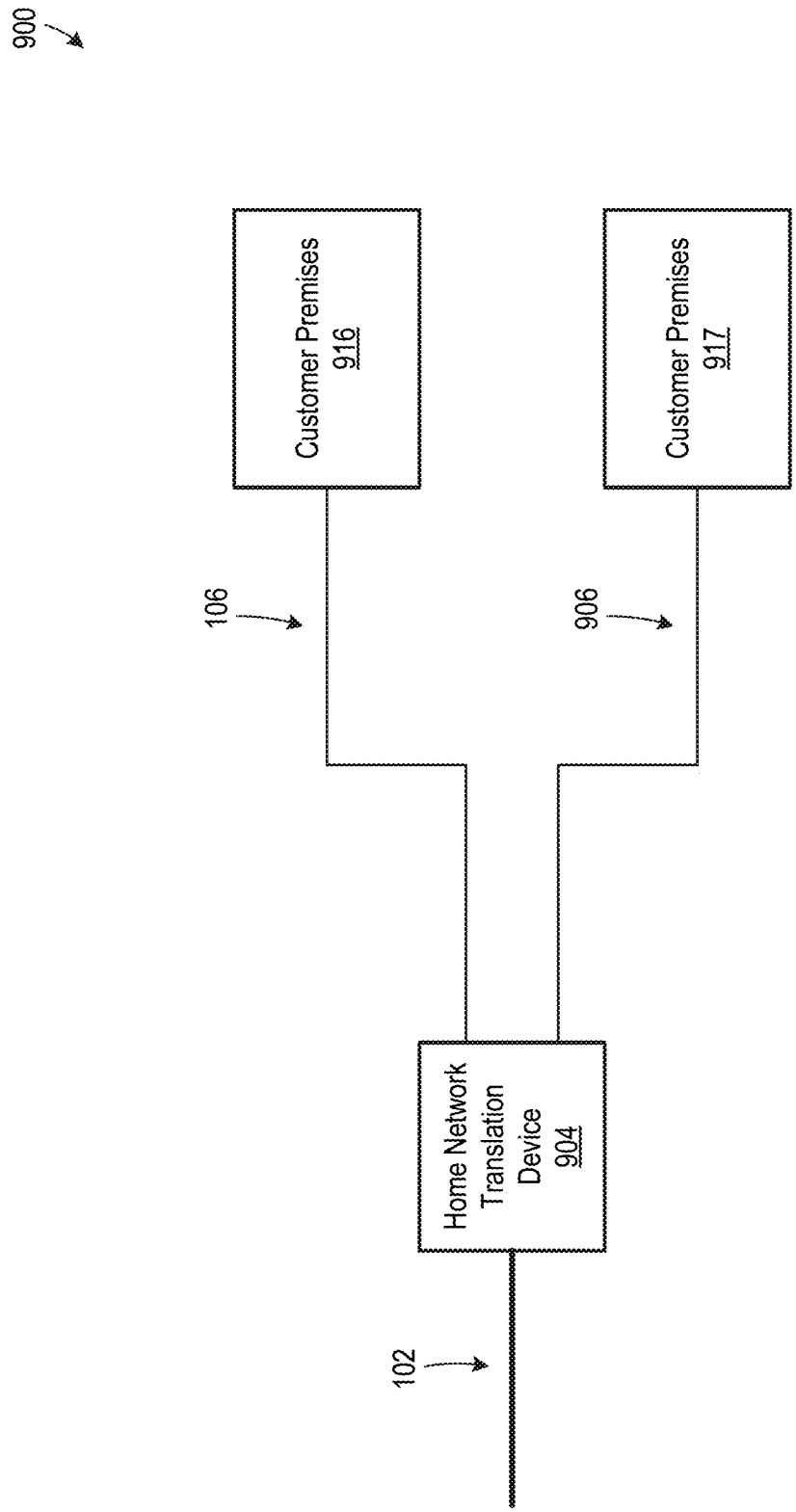
FIG. 9 is a schematic diagram illustrating a portion of a communication network including a home network translation device configured to support two customer premises, according to an embodiment.

Home network translation device 104 could be modified to support multiple customer premises. For example, FIG. 9 is a schematic diagram illustrating a portion 900 of a communication network, which is another embodiment of network portion 100. Network portion 900 includes optical cable 102, a home network translation device 904, first electrical cable 106, a second electrical cable 906 (e.g. a coaxial electrical cable or a twisted-pair electrical cable), a first customer premises 916, and a second customer premises 917. Home network translation device 904 is similar to home network translation device 104, but home network translation device 904 is configured to interface optical cable 102 with two electrical cables, i.e., with electrical cables 106 and 906. Specifically, home network translation device 904 is configured to (a) translate data between an optical protocol on optical cable 102 and a home networking protocol on first electrical cable 106 and (b) translate data between the optical protocol on optical cable 102 and a home networking protocol on second electrical cable 906. Details of customer premises 916 and 917 are not shown to promote illustrative clarity. Each customer premises 916 and 917 includes at least one termination device, e.g., termination device 108 and/or 208, and each customer premises 916 and 917 optionally includes one or more splitters and/or transformers, such as in a manner similar to that illustrated in FIGS. 3 and 8. Use of single home network translation device 904 to support multiple customer premises 916 and 917 promotes low network cost, ease of network constructions, and ease of network maintenance. Home network translation device 904 could be modified to support additional customer premises without departing from the scope hereof.

Figure 10:
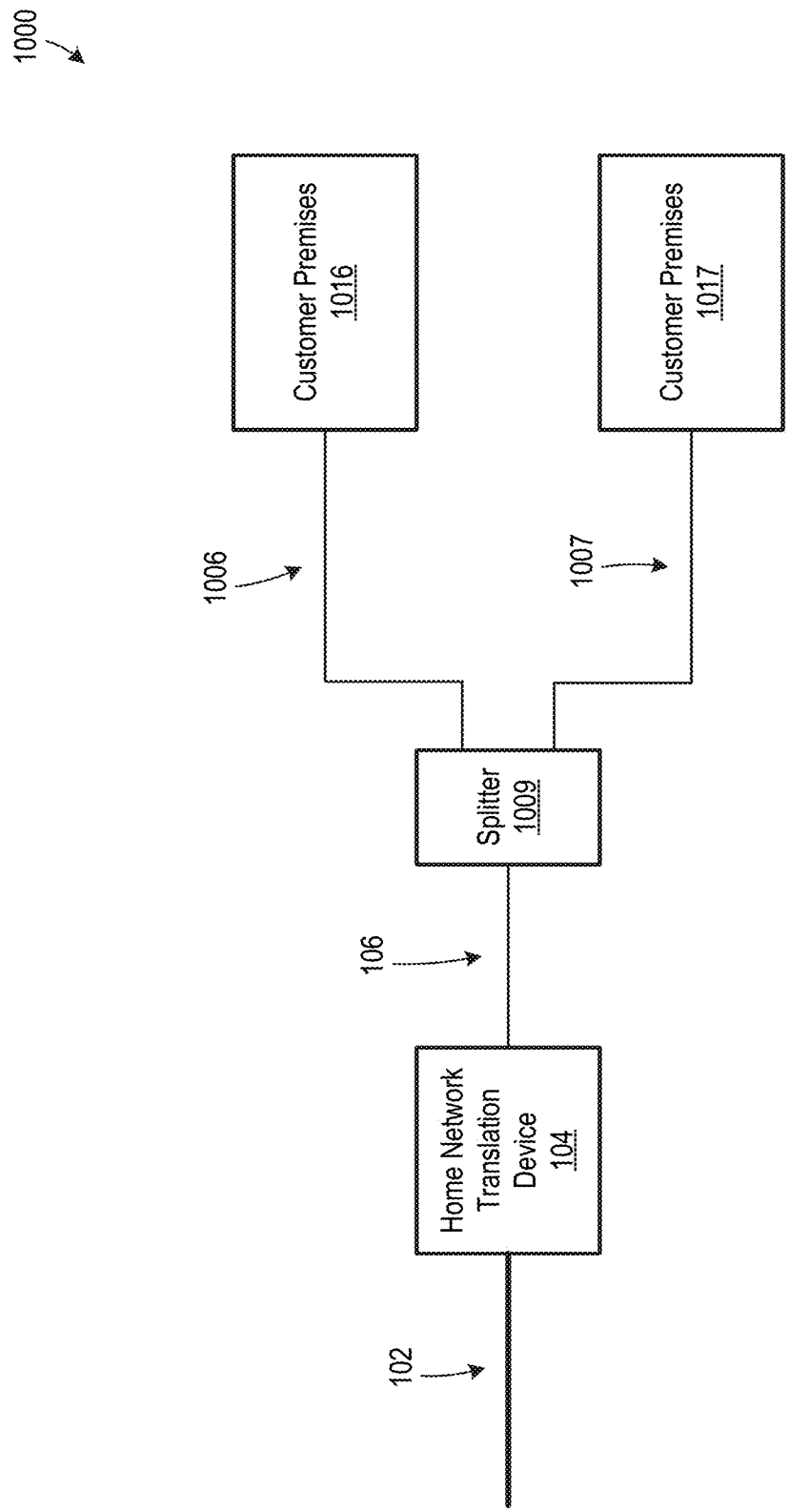
FIG. 10 is a schematic diagram illustrating a portion of a communication network including a home network translation device configured to support two customer premises via a splitter, according to an embodiment.

Home network translation device 104 could also be configured to support multiple customer premises by using one or more splitters and/or taps. For example, FIG. 10 is a schematic diagram illustrating a portion 1000 of a communication network, which is another embodiment of network portion 100. Network portion 1000 includes optical cable 102, home network translation device 104, first electrical cable 106, a second electrical cable 1006 (e.g. a coaxial electrical cable or a twisted-pair electrical cable), a third electrical cable 1007 (e.g., a coaxial electrical cable or a twisted-pair electrical cable), a first customer premises 1016, and a second customer premises 1017. First electrical cable 106 communicatively couples home network translation device 104 to an input port of splitter 1009, and second electrical cable 1006 communicatively couples an output port of splitter 1009 to first customer premises 1016. Third electrical cable 1007 communicatively couples an output port of splitter 1009 to second customer premises 1017. Details of customer premises 1016 and 1017 are not shown to promote illustrative clarity. Each customer premises 1016 and 1017 includes at least one termination device, e.g., termination device 108 and/or 208, and each customer premises 1016 and 1017 optionally includes one or more splitters and/or transformers, such as in a manner similar to that illustrated in FIGS. 3 and 8. Accordingly, home network translation device 104 serves multiple customer premises 1016 and 1017 via a splitter. Then number of customer premises served by home network translation device 104 may be varied without departing from the scope hereof.

Downstream data from home network translation device 104 will be broadcast to both customer premises 1016 and 1017. Therefore, it may be desirable to encrypt at least downstream data to protect privacy of users at customers premises 1016 and 1017. Additionally, in particular embodiments, splitter 1009 is configured to prevent upstream data from being transferred from one splitter output port to another splitter output port, to help protect user privacy.

Figure 11:
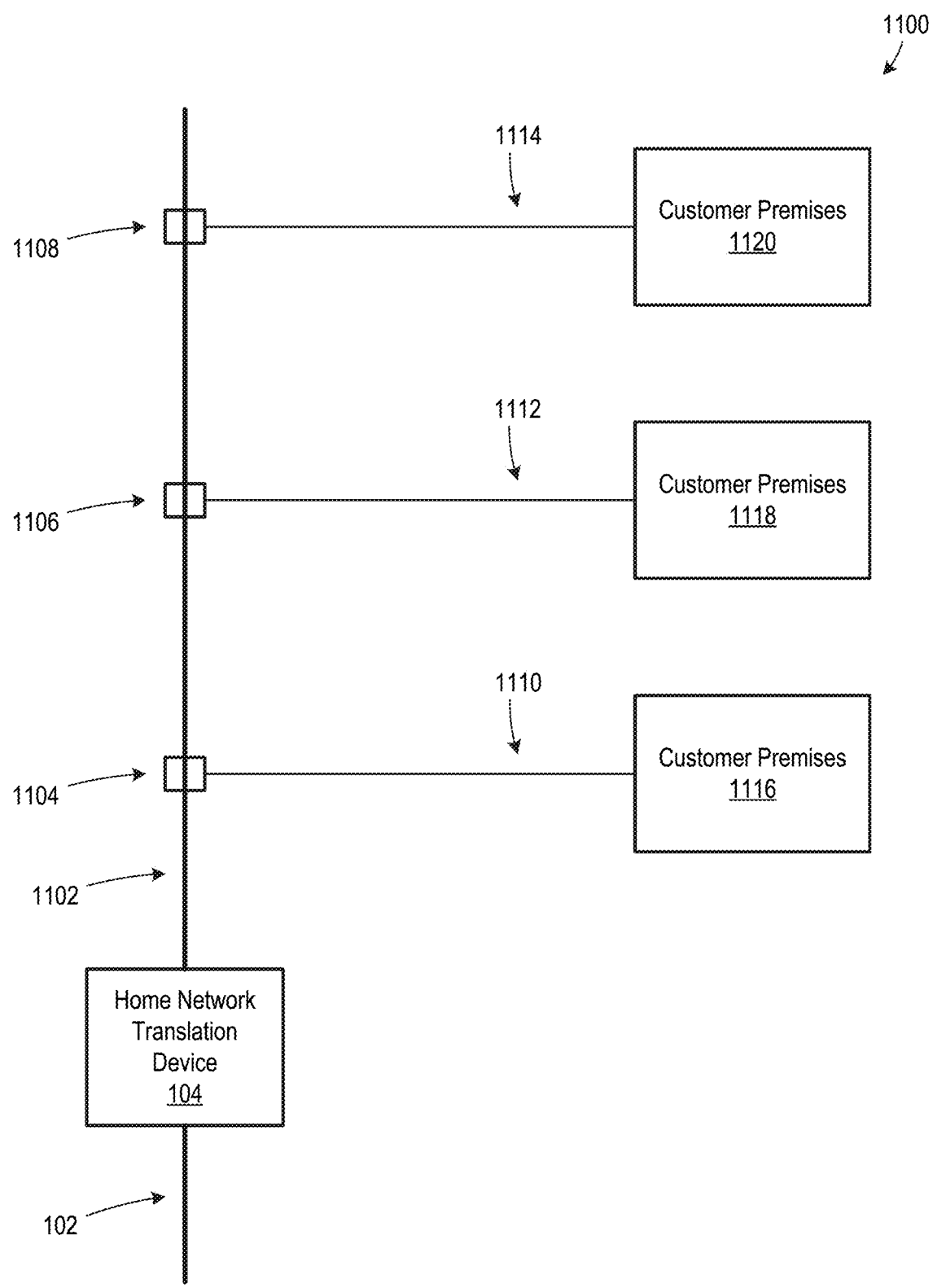
FIG. 11 is a schematic diagram illustrating a portion of a communication network including a home network translation device configured to support three customer premises via three coaxial cable taps, according to an embodiment.

As another example, FIG. 11 is a schematic diagram illustrating a portion 1100 of a communication network, which is another embodiment of network portion 100. Network portion 1100 includes optical cable 102, home network translation device 104, a coaxial electrical cable 1102, coaxial cable taps 1104-1108, coaxial electrical cables 1110-1114, and customer premises 1116-1120. Coaxial electrical cable 1102 is an embodiment of electrical cable 106, and home network translation device 104 is configured to translate data between an optical protocol on optical cable 102 and a home networking protocol on coaxial electrical cable 1102. Coaxial cable taps 1104, 1106, and 1108 are configured to electrically couple coaxial electrical cables 1110, 1112, and 1114 to coaxial electrical cable 1102. Coaxial electrical cable 1110 electrically couples customer premises 1116 to coaxial cable tap 1104, and coaxial electrical cable 1112 electrically couples customer premises 1118 to coaxial cable tap 1106. Additionally, coaxial electrical cable 1114 electrically couples customer premises 1120 to coaxial cable tap 1108. Accordingly, home network translation device 104 serves multiple customer premises 1116, 1118, and 1120 via coaxial cable taps. The number of customer premises served by home network translation device 104 may be varied without departing from the scope hereof. For example, network potion 1100 can be reconfigured simply by adding additional coaxial cable taps, in some embodiments.

Downstream data from home network translation device 104 will be broadcast to all customer premises 1116, 1118, and 1120. Therefore, it may be desirable to encrypt at least downstream data to protect privacy of users at customers premises 1116, 1118, and 1120.

FIG. 12 is a schematic diagram illustrating a home network translation device 1200, which is one possible embodiment of home network translation device 104. It should be realized, however, that home network translation device 104 may be embodied in other manners without departing from the scope hereof. Home network translation device 1200 includes an optical network unit (ONU) 1202, a home networking interface 1204, a power supply 1206, an inductor 1208, and an electrical cable 1210. Electrical cable 1210 communicatively couples ONU 1202 and home networking interface 1204, and in some embodiments, electrical cable 1210 includes an Ethernet cable. ONU 1202 is configured to translate data between an optical protocol on optical cable 102 and an electrical protocol on electrical cable 1210, e.g. an Ethernet protocol, using a technique known in the art. Home networking interface 1204 is configured to translate data between the electrical protocol on electrical cable 1210 to a home networking protocol on electrical cable 106 using a technique known in the art. Power supply 1206 is configured to receive electrical power from electrical cable 106 and convert the electrical power to a form suitable for use in powering home network translation device 1200, e.g. by regulating power supply voltage. Inductor 1208 couples electrical power from electrical cable 106 to power supply 1206, to prevent power supply 1206 from interfering with home networking data on electrical cable 106.

A conventional inductor typically exhibits undesired resonance at high frequencies due to parasitic capacitance of the inductor, and this resonance may interfere with high-frequency data transmission. Applicant has found, however, that such undesired resonance can be significantly reduced, or even essentially eliminated, by use of an inductor having a tapered shape, e.g. a conical shape or a wedge shape. In particular, the tapered shape helps reduce parasitic capacitance, thereby helping reduce undesired resonance at high-frequencies. Accordingly, in certain embodiments, inductor 1208 has a tapered shape to promote ability of home network translation device 1200 to transmit high-frequency data over electrical cable 106. One possible embodiment of an inductor having a conical shape is discussed below with respect to FIGS. 17 and 18, and one possible embodiment of an inductor having a wedge shape is discussed below with respect to FIGS. 19 and 20.

FIG. 13 is a schematic diagram illustrating a power inserter 1300, which is one possible embodiment of power inserter 324 of FIGS. 3 and 8. Power inserter 1300 includes a power supply 1302, an inductor 1304, and an output port 1306. Inductor 1304 is electrically coupled between power supply 132 and output port 1306 to isolate an electrical cable connected to output port 1306 from power supply 1304. In some embodiments, inductor 1304 has a tapered shape to promote ability of the electrical cable to transmit high-frequency data. Power supply 1302 generates AC and/or DC electrical power that is coupled to output port 1306 by inductor 1304.

FIG. 14 is a schematic diagram illustrating a power inserter 1400, which is another possible embodiment of power inserter 324 of FIGS. 3 and 8. Power inserter 1400 includes a power supply 1402, a first jumper 1404, a second jumper 1406, a first inductor 1408, a second inductor 1410, a first output port 1412, a second output port 1414, and a bypass capacitor 1416. Power inserter 1400 is configured to be electrically coupled in-series with an electrical cable via output ports 1412 and 1414. Bypass capacitor 1416 provides a path for high-frequency data signals to bypass power supply 1402. First inductor 1408 electrically couples power supply 1402 to first output port 1412, and second inductor 1410 electrically couples power supply 1402 to second output port 1414. Power supply 1402 generates AC and/or DC electrical power, and power inserter 1400 is capable of inserting electrical power at each of first output port 1412 and second output port 1414. However, power inserter 1400 can be configured to provide electrical power to solely first output port 1412 by removing second jumper 1406. Similarly, power inserter 1400 can be configured to provide electrical power to solely second output port 1414 by removing first jumper 1404. In some embodiments, each of first inductor 1408 and second inductor 1410 has a tapered shape to promote ability of the electrical cable to transmit high-frequency data.

Figure 15:
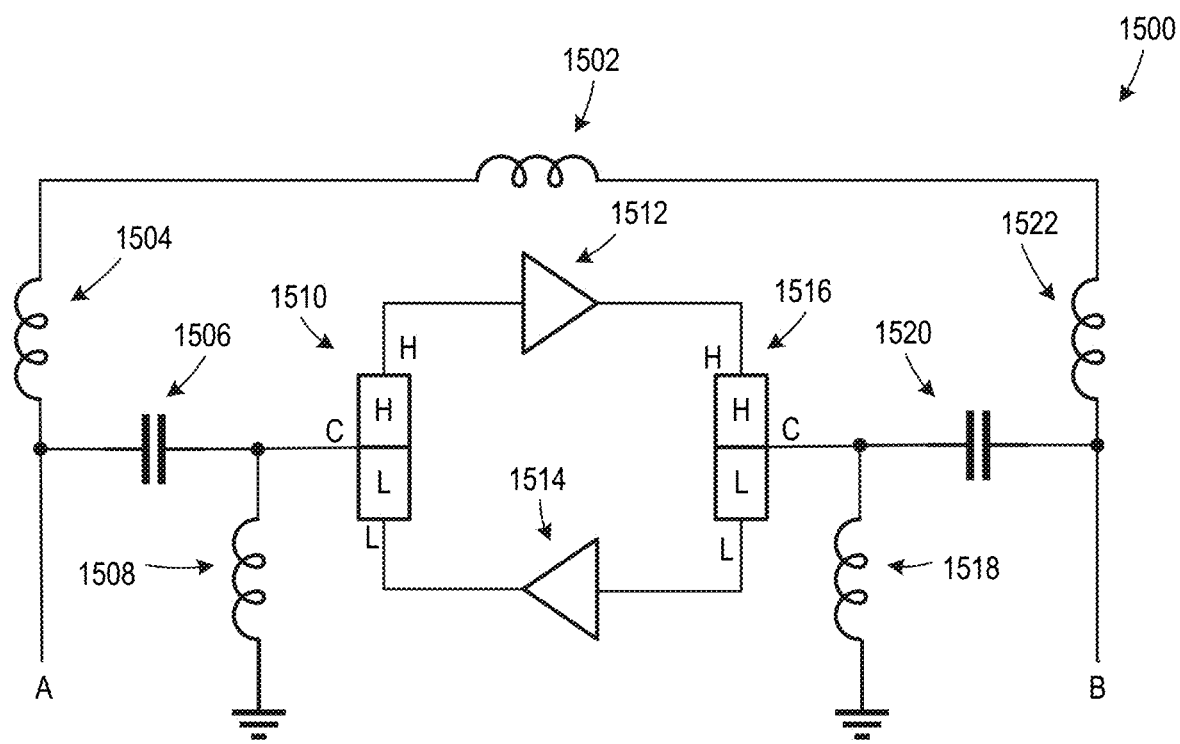
FIG. 15 is a schematic diagram illustrating an amplifier, according to an embodiment.

FIG. 15 is a schematic diagram illustrating an amplifier 1500, which is another possible application of tapered-shaped inductors. Amplifier 1500 includes a bypass inductor 1502, an inductor 1504, a capacitor 1506, an inductor 1508, a diplexer 1510, an amplifier stage 1512, an amplifier stage 1514, a diplexer 1516, an inductor 1518, a capacitor 1520, and an inductor 1522. Bypass inductor 1502, inductor 1504, and inductor 1522 are electrically coupled in series between amplifier ports A and B to allow low-frequency signals, e.g. electrical power signals, to bypass amplifier 1500. Capacitor 1506 is electrically coupled between port A and diplexer 1510 port C. Inductor 1508 is electrically coupled between diplexer 1510 port C and ground. Amplifier stage 1512 is electrically coupled between diplexer 1510 port H and diplexer 1516 port H, and amplifier stage 1514 is electrically coupled between diplexer 1510 port L and diplexer 1516 port L. Capacitor 1520 is electrically coupled in between diplexer 1516 port C and port B, and inductor 1518 is electrically coupled between diplexer 1516 port C and ground.

Amplifier stage 1512 amplifies relatively high-frequency downstream signals passing from port A to port B, and amplifier stage 1514 amplifies relatively low-frequency upstream signals passing from port B to port A. In some embodiments, each of bypass inductor 1502, inductor 1504, inductor 1508, inductor 1518, and inductor 1522 has a tapered shape to promote compatibility of amplifier 1500 with high-frequency signals.

Figure 16:
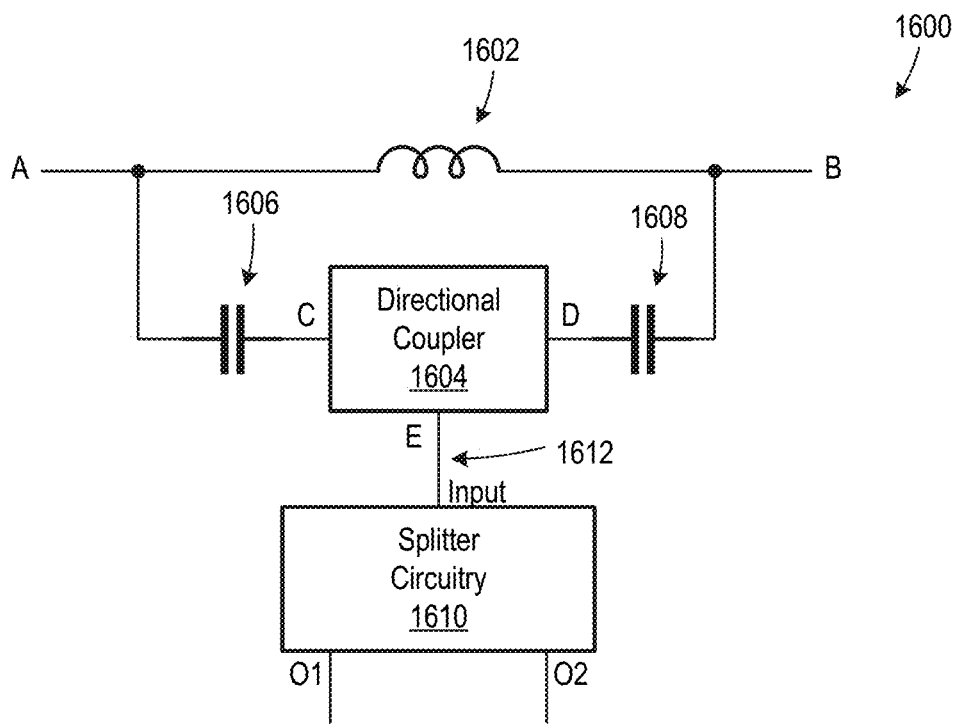
FIG. 16 is a schematic diagram of a coaxial cable tap, according to an embodiment.

FIG. 16 is a schematic diagram of a coaxial cable tap 1600, which is one possible embodiment of coaxial cable taps 1104, 1106, and 1108 of FIG. 11. Coaxial cable tap 1600 includes a bypass inductor 1602, a directional coupler 1604, a capacitor 1606, a capacitor 1608, and splitter circuitry 1610. Bypass inductor 1602 is electrically coupled between splitter ports A and B to allow low-frequency signals, e.g. electrical power signals, to pass through splitter 1600. Capacitor 1606, directional coupler 1604, and capacitor 1608 are electrically coupled in series between splitter ports A and B. High-frequency communication signals passing from port A to port B pass through capacitor 1606, directional coupler 1604, and capacitor 1608, and directional coupler 1604 directs a portion 1612 of the signals to splitter circuitry 1610. Splitter circuitry 1610 splits signal portion 1612 into signals on outputs O1 and O2, although splitter circuitry 1610 could be modified to have a different number of output ports without departing from the scope hereof. In some embodiments, bypass inductor 1602 has a tapered shape to promote compatibility of tap 1600 with high-frequency signals.

Figure 17:
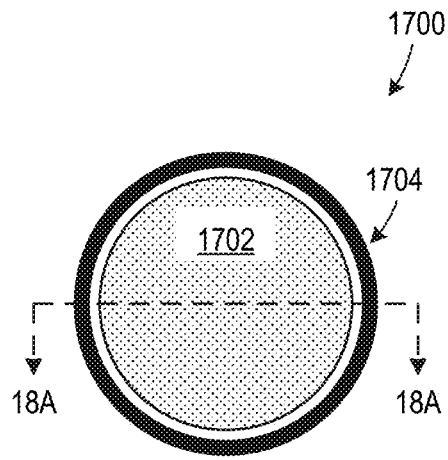
FIG. 17 is a top plan view of an inductor having a conical shape, according to an embodiment.
Figure 18:
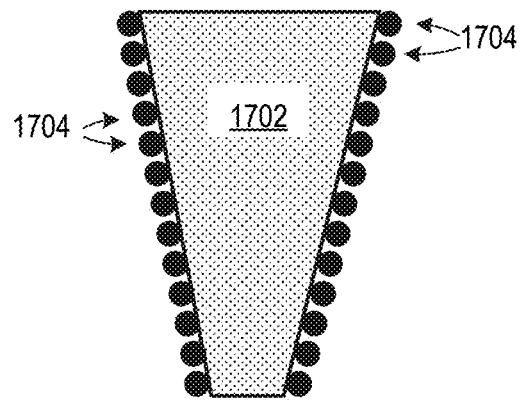
FIG. 18 is a cross-sectional view of the FIG. 17 inductor.

FIG. 17 is a top plan view of an inductor 1700 having a conical shape, and FIG. 18 is a cross-sectional view of inductor 1700 taken along line 18A-18A of FIG. 17. Inductor 1700 is one possible embodiment of the inductors having a tapered shape discussed above. Inductor 1700 includes a magnetic core 1702 and winding forming one or more turns 1704 around magnetic core 1702. Magnetic core 1702 is formed, for example, of a ferrite magnetic material or a powdered iron magnetic material within a binder. Only some turns 1704 are labeled in FIG. 18 to promote illustrative clarity. The number of turns 1704, as well as the type of wire forming turns 1704, may be varied. For example, inductor 1700 could be modified so that turns 1704 have a rectangular cross-section instead of a circular cross-section, and as another example, inductor 1700 could be modified so that the wire forming turns 1704 is litz wire or stranded wire instead of solid wire. The shape of magnetic core 1702 could also be varied as long as the shape is conical.

Figure 19:
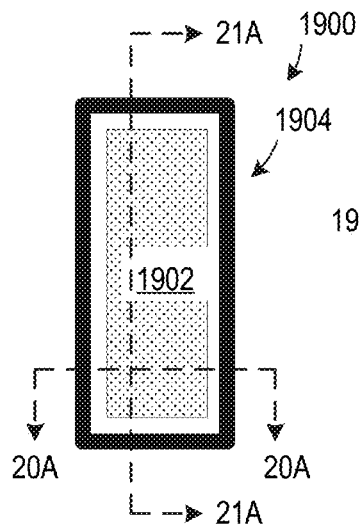
FIG. 19 is a top plan view of an inductor having a wedge shape, according to an embodiment.
Figures 20, 21:
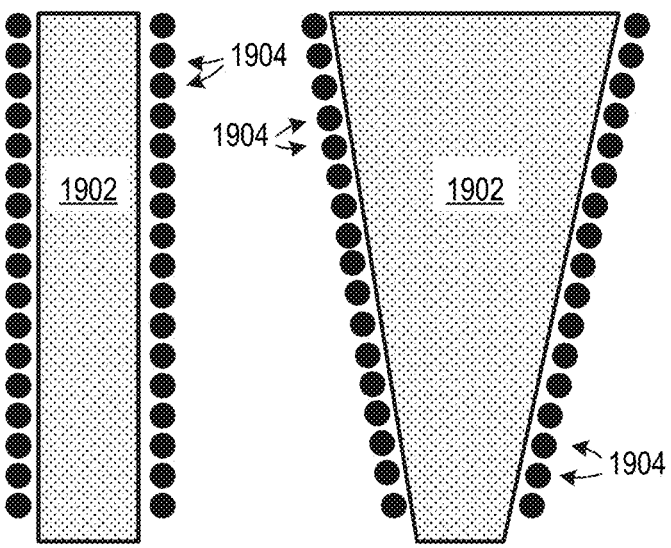
FIG. 20 is a cross-sectional view of the FIG. 19 inductor.
FIG. 21 is another cross-sectional view of the FIG. 19 inductor.

FIG. 19 is a top plan view of an inductor 1900 having a wedge shape, FIG. 20 is a cross-sectional view of inductor 1900 taken along line 20A-20A of FIG. 19, and FIG. 21 is a cross-sectional view of inductor 1900 taken along line 21A-21A of FIG. 19. Inductor 1900 is another possible embodiment of the inductors having a tapered shape discussed above. Inductor 1900 includes a magnetic core 1902 and winding forming one or more turns 1904 around magnetic core 1902. Magnetic core 1902 is formed, for example, of a ferrite magnetic material or a powdered iron magnetic material within a binder. Only some turns 1904 are labeled in FIGS. 20 and 21 to promote illustrative clarity. The number of turns 1904, as well as the type of wire forming turns 1904, may be varied. For example, inductor 1900 could be modified so that turns 1904 have a rectangular cross-section instead of a circular cross-section, and as another example, inductor 1900 could be modified so that the wire forming turns 1904 is litz wire or stranded wire instead of solid wire. The shape of magnetic core 1902 could also be varied as long as the shape is a wedge shape.

Figure 22:
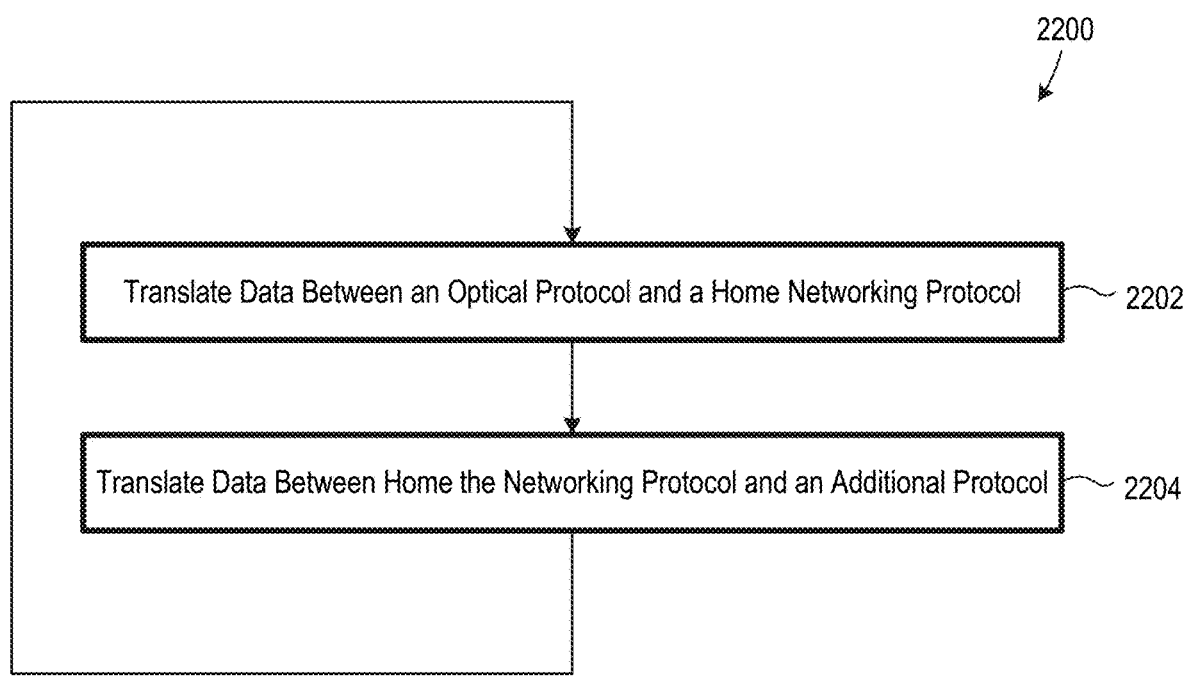
FIG. 22 is a flow chart illustrating a method for transferring data using a communication network, according to an embodiment.

FIG. 22 is a flow chart illustrating a method for transferring data using a communication network. In a block 2202, data is translated between an optical protocol on an optical cable and a home networking protocol on a first electrical cable. In one example of block 2202, data is translated between an optical protocol on optical cable 102 and a home networking protocol on electrical cable 106 using home network translation device 104. In a block 2204, data is translated between the home networking protocol on the first electrical cable and an additional protocol on an additional communication medium. In one example of bock 2204, data is translated between a home networking protocol on electrical cable 106 and an additional protocol, e.g. an Ethernet protocol, on additional communication medium 110 using termination device 108. Blocks 2202 and 2204 optionally repeat indefinitely.

Combinations of Features

Features described above may be combined in various ways without departing from the scope hereof. The following examples illustrate some possible combinations:

(A1) A communication network may include a first electrical cable, a home network translation device, and a first termination device. The home network translation device may be communicatively coupled between an optical cable and the first electrical cable, and the home network translation device may be configured to translate data between an optical protocol on the optical cable and a home networking protocol on the first electrical cable. The first termination device may be communicatively coupled to the first electrical cable and configured to translate data between the home networking protocol on the first electrical cable and an additional protocol on an additional communication medium communicatively coupled to the first termination device.

(A2) In the network denoted as (A1), the first electrical cable may include a drop cable.

(A3) In any one of the networks denoted as (A1) and (A2), the first termination device may be located within a customer premises, and the home network translation device may be located outside of the customer premises.

(A4) Any one of the networks denoted as (A1) through (A3) may further include a power inserter located within the customer premises and configured to electrically power the home network translation device via the first electrical cable.

(A5) In the network denoted as (A4), the power inserter may include power supply circuitry and an inductor having a tapered shape, the inductor electrically interfacing the power supply circuitry with the first electrical cable.

(A6) In any one of the networks denoted as (A4) and (A5), the home network translation device may include an inductor having a tapered shape electrically coupled between the first electrical cable and a power supply of the home network translation device, to couple electrical power from the electrical cable to the power supply of the home network translation device.

(A7) In any one of the networks denoted as (A1) through (A6), the home networking protocol may be one of a Multi-Media over Coax (MoCA) protocol and a HomePNA (G.hn) protocol.

(A8) In any one of the networks denoted as (A1) through (A7), the optical protocol may be one of an Ethernet passive optical network (EPON) protocol, a radio frequency of over glass (RFOG) protocol, and a Gigabit-capable passive optical network (GPON) protocol.

(A9) In any one of the networks denoted as (A1) through (A8), the home network translation device may be configured to transmit data upstream over the optical cable in response to a grant received from a cable modem termination system (CMTS) communicatively coupled to the fiber optic cable.

(A10) In any one of the networks denoted as (A1) through (A9), the home network translation device may be further configured to transmit a broadcast signal over the first electrical cable while communicating with the first termination device via the first electrical cable using the home networking protocol.

(A11) In any one of the networks denoted as (A1) through (A10), the additional protocol may be an Ethernet protocol, and the additional communication medium may be an Ethernet cable.

(A12) In any one of the networks denoted as (A1) through (A10), the additional protocol may be an IEEE 802.11 protocol, and the additional communication medium may be a wireless communication medium.

(A13) In any one of the networks denoted as (A1) through (A12), the first electrical cable may include a coaxial cable.

(A14) The network denoted as (A13) may further include a transformer, where the first termination device is communicatively coupled to the first electrical cable via the transformer.

(A15) The network denoted as (A14) may further include a second termination device communicatively coupled to the first electrical cable via the transformer, the second termination device being configured to translate data between the home networking protocol on the first electrical cable and a second additional protocol on a second additional communication medium coupled to the second termination device.

(A16) The network denoted as (A13) may further include a splitter, where the first termination device is communicatively coupled to the first electrical cable via the splitter.

(A17) The network denoted as (A16) may further include a second termination device communicatively coupled to the first electrical cable via the splitter, the second termination device being configured to translate data between the home networking protocol on the first electrical cable and a second additional protocol on a second additional communication medium coupled to the second termination device, wherein the splitter is configured to provide a communication path between the first and second termination devices.

(A18) In any one of the networks denoted as (A1) through (A12), the first electrical cable may include a twisted-pair cable.

(A19) In any one of the networks denoted as (A1) through (A18), the home network translation device may be configured to serve as a network host to the first termination device.

(A20) Any one of the networks denoted as (A1) through (A19) may further include a second electrical cable and a second termination device communicatively coupled to the second electrical cable. The second termination device may be configured to translate data between the home networking protocol on the second electrical cable and a second additional protocol on a second additional communication medium coupled to the second termination device.

(A21) In the network denoted as (A20), the first termination device and the second termination device may be located within different respective customer premises.

(B1) A method for transferring data using a communication network may include (1) translating data between an optical protocol on an optical cable and a home networking protocol on a first electrical cable and (2) translating the data between the home networking protocol on the first electrical cable and an additional protocol on an additional communication medium.

(B2) In the method denoted as (B1), translating the data between the home networking protocol on the first electrical cable and the additional protocol on the additional communication medium may be performed within a customer premises, and translating data between the optical protocol on the optical cable and the home networking protocol on the first electrical cable may be performed outside of the customer premises.

(B3) In any one of the methods denoted as (B1) and (B2), the home networking protocol may be one of a Multi-Media over Coax (MoCA) protocol and a HomePNA (G.hn) protocol.

(B4) In any one of the methods denoted as (B1) through (B3), the optical protocol may be one of an Ethernet passive optical network (EPON) protocol, a radio frequency of over glass (RFOG) protocol, and a Gigabit-capable passive optical network (GPON) protocol.

(B5) Any one of the methods denoted as (B1) through (B4) may further include transmitting data upstream over the optical cable in response to a grant received from a cable modem termination system (CMTS) communicatively coupled to the optical cable.

(B6) Any one of the methods denoted as (B1) through (B5) may further include transmitting a broadcast signal over the first electrical cable while transmitting data through the first electrical cable using the home networking protocol.

(B7) In any one of the methods denoted as (B1) through (B6), the additional protocol may be an Ethernet protocol, and the additional communication medium may be an Ethernet cable.

(B8) In any one of the methods denoted as (B1) through (B6), the additional protocol may be an IEEE 802.11 protocol, and the additional communication medium may be a wireless communication medium.

(C1) A power inserter may include a bypass capacitor electrically coupled between a first radio frequency (RF) port and a second RF port, a power supply, a first inductor having a tapered shape electrically coupled between the power supply and the first RF port, and a second inductor having a tapered shape electrically coupled between the power supply and the second RF port.

(D1) A coaxial cable tap may include an inductor having a tapered shape electrically coupled between an input port and an output port, a directional coupler, a first bypass capacitor electrically coupled between the input port and the directional coupler, a second bypass capacitor electrically coupled between the directional coupler and the output port, and splitter circuitry electrically coupled to the directional coupler.

Changes may be made in the above communication networks and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A communication network, comprising:
   a first coaxial electrical cable;
   a home network translation device communicatively coupled between an optical cable and the first coaxial electrical cable, the home network translation device configured to translate data between an optical protocol on the optical cable and a home networking protocol on the first coaxial electrical cable;
   a first termination device communicatively coupled to the first coaxial electrical cable and configured to translate data between the home networking protocol on the first coaxial electrical cable and an additional protocol on an additional communication medium communicatively coupled to the first termination device;
   a second termination device communicatively coupled to the first coaxial electrical cable and configured to translate data between the home networking protocol on the first coaxial electrical cable and a second additional protocol on a second additional communication medium communicatively coupled to the second termination device; and
   a transformer configured to serve as a splitter by communicatively coupling each of the first and second termination devices to the first coaxial electrical cable, such that home networking signals can flow between the first and second termination devices via the transformer.

2. The network of claim 1, wherein the first termination device is located within a customer premises, and the home network translation device is located outside of the customer premises.

3. The network of claim 2, further comprising a power inserter located within the customer premises and configured to electrically power the home network translation device via the first coaxial electrical cable.

4. The network of claim 3, wherein the power inserter includes power supply circuitry and an inductor having a tapered shape, the inductor electrically interfacing the power supply circuitry with the first coaxial electrical cable.

5. The network of claim 3, wherein the home network translation device comprises an inductor having a tapered shape electrically coupled between the first coaxial electrical cable and a power supply of the home network translation device, to couple electrical power from the first coaxial electrical cable to the power supply of the home network translation device.

6. The network of claim 1, wherein:
the home networking protocol is one of a Multi-Media over Coax (MoCA) protocol and a HomePNA (G.hn) protocol; and
the optical protocol is one of an Ethernet passive optical network (EPON) protocol, a radio frequency of over glass (RFOG) protocol, and a Gigabit-capable passive optical network (GPON) protocol.

7. The network of claim 1, wherein the home network translation device is configured to transmit data upstream over the optical cable in response to a grant received from a cable modem termination system (CMTS) communicatively coupled to the optical cable.

8. The network of claim 1, wherein the home network translation device is further configured to transmit a broadcast signal over the first coaxial electrical cable while communicating with the first termination device via the first coaxial electrical cable using the home networking protocol.

9. The network of claim 1, wherein the home network translation device is configured to serve as a network host to the first termination device.

* * * * *